US010186870B2

(12) United States Patent
Sofaly et al.

(10) Patent No.: US 10,186,870 B2
(45) Date of Patent: Jan. 22, 2019

(54) METHOD AND FEED CONTROL FOR THE FEEDING OF ELECTRICAL CURRENT INTO A LINE BRANCH

(71) Applicant: SMA Solar Technology AG, Niestetal (DE)

(72) Inventors: Bernhard Sofaly, Kassel (DE); Oliver Prior, Marsberg (DE)

(73) Assignee: SMA Solar Technology AG, Niestetal (DE)

( * ) Notice: Subject to any disclaimer, the term of this patent is extended or adjusted under 35 U.S.C. 154(b) by 381 days.

(21) Appl. No.: 15/057,376

(22) Filed: Mar. 1, 2016

(65) Prior Publication Data
US 2016/0181810 A1 Jun. 23, 2016

Related U.S. Application Data

(63) Continuation of application No. PCT/EP2014/068526, filed on Sep. 1, 2014.

(30) Foreign Application Priority Data

Sep. 3, 2013 (DE) .................... 10 2013 109 608

(51) Int. Cl.
H02J 7/34 (2006.01)
H02J 3/38 (2006.01)
(Continued)

(52) U.S. Cl.
CPC ............ *H02J 3/383* (2013.01); *H02H 3/006* (2013.01); *H02J 3/32* (2013.01); *H02J 7/35* (2013.01);
(Continued)

(58) Field of Classification Search
CPC .. H02H 3/006; H02J 3/32; H02J 7/35; H02M 7/44; Y02E 70/30; Y02E 10/563
See application file for complete search history.

(56) References Cited

U.S. PATENT DOCUMENTS 6,605,881 B2 * 8/2003 Takehara ................ H02J 3/383
307/64
8,362,646 B2 1/2013 Wahl
(Continued)

FOREIGN PATENT DOCUMENTS

EP 2388879 A1 11/2011
EP 2498364 A1 9/2012
(Continued)

Primary Examiner — Jared Fureman
Assistant Examiner — Duc M Pham
(74) Attorney, Agent, or Firm — Eschweiler & Potashnik, LLC

(57) ABSTRACT

A method for the feeding of electrical current into a line branch of an electrical installation that is protected by a line protection fuse and is designed for a current up to a maximum permissible value includes feeding into the line branch an electrical current from an external energy supply network and electrical current from an energy generating system. The method further includes limiting the feeding in of the electrical current into the line branch from the external energy supply network by the line protection fuse, which prescribes a limit value for the electrical current fed into the line branch, and controlling the feeding in of the electrical current generated by the energy generating system so that no more than a specific, but variable maximum current is fed into the line branch. The variable maximum current is raised, under the control of a feed control, to allow more electrical current from the energy generating system to be fed into the line branch after the limit value of the line protection fuse has been lowered, under the control of the feed control, in such a way that the maximum permissible value of the current in the line branch is not exceeded even after the raising of the maximum current.

14 Claims, 3 Drawing Sheets

(51) Int. Cl.
   *H02J 3/32* (2006.01)
   *H02J 7/35* (2006.01)
   *H02H 3/00* (2006.01)
   *H02M 7/44* (2006.01)

(52) U.S. Cl.
   CPC .............. *H02M 7/44* (2013.01); *Y02E 10/563* (2013.01); *Y02E 10/566* (2013.01); *Y02E 70/30* (2013.01)

(56) References Cited

U.S. PATENT DOCUMENTS

2011/0121652 A1    5/2011   Sella et al.
2011/0241426 A1    10/2011  Wahl
2014/0142772 A1*   5/2014   Kubota ................. G06Q 50/06
                                                           700/291

FOREIGN PATENT DOCUMENTS

EP         2587623  A1    5/2013
WO         0229954  A1    4/2002

* cited by examiner

METHOD AND FEED CONTROL FOR THE FEEDING OF ELECTRICAL CURRENT INTO A LINE BRANCH

CROSS REFERENCE TO RELATED APPLICATIONS

This application claims priority to International Patent Application number PCT/EP2014/068526, filed on Sep. 1, 2014, which claims priority to German Patent Application number 10 2013 109 608.5, filed on Sep. 3, 2013, and is hereby incorporated by reference in its entirety.

FIELD

The disclosure relates to a method for the feeding of electrical current from an energy generating system and an external energy supply network into a line branch of an electrical installation that is protected by a line protection fuse and is designed for a current up to a maximum permissible value. The disclosure also relates to a feed control for the feeding of electrical current from an energy generating system and an external energy supply network into such a line branch of an electrical installation.

In particular, the electrical installation may be a domestic installation, the domestic installation being fitted with a photovoltaic system (PV system) for providing an internal power supply for the household.

BACKGROUND

In the case of known domestic installations that are fitted with a PV system for providing an internal power supply, the PV system is designed in such a way that, as a maximum, it feeds as much electrical current into a line branch of the domestic installation that a current flowing in the line branch does not exceed a maximum permissible value. In order to ensure the energy supply even when the PV system does not generate and feed in sufficient electrical current, the line branch is connected to an external energy supply network. The connection to the external energy supply network usually takes place by way of an energy meter that is fitted with a line protection fuse. It is ensured by the line protection fuse that no more electrical current than is permissible for the line branch is fed into the line branch from the external energy supply network. The PV system, however, is not necessarily connected to the line branch by way of the energy meter with the line protection fuse, but at another location of the line branch, for example at its end in the region of the roof of the house. Since the current generated and fed in by the PV system then does not flow through the line protection fuse of the line branch concerned, the case may occur where more current than is permissible is fed into the line branch, i.e. the line branch is not protected by the line protection fuse from a state of overcurrent, in which the current flowing in the line branch exceeds the maximum permissible value.

The documents US 2011/0241426 A1 and, belonging to the same patent family, U.S. Pat. No. 8,362,646 B2 disclose a method by which states of overcurrent within a line branch with two separate current feeds are to be avoided. For this purpose, a current sensor, with which the current fed in from the external energy supply network is recorded, is provided in the region of the connection point for the external energy supply network. This value is transmitted to a control of an inverter of the PV system. It is then checked by the control whether the sum of a current fed in from the external energy supply network and a current fed in from the PV system exceeds the maximum permissible current value for the corresponding line branch. If the maximum permissible current value is exceeded, the PV system is switched off or cut back in such a way that the sum of the currents fed in does not exceed the permissible current value. Switching off of the PV system also takes place if the information that is required to check whether the sum of a current fed in from the external energy supply network and a current fed in from the PV system exceeds the maximum permissible current value for the corresponding line branch is not received. If the PV system does not respond to the commands for switching off or cutting back when the permissible current value is exceeded by the sum of the two current feeds, the current is also not switched off by a power protection fuse provided at the connection point for the external energy supply network.

The document EP 2 388 879 A1 discloses a different method, by which states of overcurrent within a line branch into which electrical current from an electrical energy supply network and electrical current from a local energy generating system are fed are to be avoided. A protective device is provided for this purpose in the region of the connection point for the external energy supply network. The protective device receives on the one hand a measured value of a current that is fed in from the external energy supply network, and on the other hand a measured value of a current that is fed in at the same point in time from the local energy generating system. A sum of the two measured values is determined by the protective device. If the sum of the currents fed in exceeds the maximum permissible value for the current in the line branch, a protective switch that separates the line branch from the external energy supply network is opened. The individual measured values are provided at the place where they are generated with a timestamp. Until the protective device has received all of the measured values associated with the same point in time, the measured values already available are buffer-stored.

Document U.S. Pat. No. 6,605,881 B2 discloses a connection box by way of which a PV system and an external energy supply network can be connected to a line branch with a load. Provided at the connection point for the line branch with the load is a current sensor, by way of which a current flowing to the load is detected. Also provided is a voltage sensor, with which the voltage of the external energy supply network is detected. From the two values it can be determined what power is being consumed at that moment by the load. The PV system is then controlled in dependence on the power required by the load, it being ensured that the power fed in from the external energy supply network does not exceed a predetermined value. To protect against a state of overcurrent, the connection box has a protective switch, with which the power branch can be separated from the PV system and the external energy supply network if the sum of the two currents is greater than a maximum permissible current of the line branch with the load.

The document WO 02/29954 A1 discloses the use of a controllable overcurrent protection for the connection of a load to an energy supply network. By allowing the overcurrent protection to be adapted for example with regard to its triggering threshold and its triggering characteristic, it is intended that the overcurrent protection can be used flexibly for various loads, allowing optimum protection from a state of overcurrent to be ensured in each case by taking their various requirements into account.

SUMMARY

The disclosure addresses the problem of providing a method in which electrical current from an energy generating system and an external energy supply network can be fed into a line branch, it being prevented with certainty that a maximum permissible value of the current in the line branch is exceeded. It is at the same time intended to avoid unnecessary throttling of the current fed in from the energy generating system. Furthermore, the disclosure addresses the problem of providing a feed control for the feeding of electrical current from an energy generating system and an external energy supply network into a line branch of an electrical installation with which the occurrence of a greater current than the maximum permissible current in the line branch is prevented with certainty.

In the case of the procedures known from the prior art, the feeding in of electrical current from a PV system and an external energy supply network is controlled in such a way that the PV system is cut back after it has been detected by way of corresponding sensors that more current than is permissible is being fed into a line branch. This means that, at least for a certain period of time, there is necessarily a state of overcurrent. Also in the case of the procedure known from EP 2 388 879 A1, it is not possible with certainty to rule out the possibility of there being a state of overcurrent, at least for a short time, since the current fed in from the local energy generating system first has to be measured and transmitted to the protective device for switching off the current feed of the external energy supply network. In the case of the procedures known from the prior art, the time period over which a state of overcurrent has to be accepted depends in particular on the sensitivity of the sensors, the speed of the communication and also the time period that is necessary for the cutting back of the PV system. Among other things, the communication with the PV system or with the protective device in such a system has to meet increased requirements with regard to its reliability, since it is partly responsible for the safety of the domestic installation. In particular in the event of a failure of the communication or long data transit times in the communication, the safety of the domestic installation may not be sufficiently ensured—at least not without additional, possibly complex measures.

According to the disclosure, it has been found that such a state of overcurrent can be avoided if the current from the external energy supply network is fed in by way of a line protection fuse with a variable limit value for the current fed in from the external energy supply network and the feeding in of more current from the energy generating system takes place in dependence on the variable limit value. For this purpose, in one embodiment a maximum current for the current fed in from the energy generating system is only raised, under the control of a feed control, after the limit value of the line protection fuse has been lowered, i.e. reduced, under the control of the feed control, to the extent that the maximum permissible value of the current in the line branch is not exceeded. Further information is then not required either at the energy generating system or at the line protection fuse in order to prevent more current than the maximum permissible value being fed in. For example, it is not required for controlling the energy generating system to determine how much current is being fed in at that moment from the external energy supply network, since how much current as a maximum can be fed in from the external energy supply network has already been taken into account in the maximum current.

In the case of a method according to the disclosure, electrical current is fed into the line branch on the one hand from an external energy supply network and on the other hand from an energy generating system. For the feeding of current from the external energy supply network into the line branch, a line protection fuse that prescribes a variable limit value for the current fed in is provided. The current fed in from the external energy supply network is limited by the limit value of the line protection fuse. Exceeding the limit value would lead to triggering of the line protection fuse—possibly after a prescribed time period or in accordance with a triggering characteristic that is stored within the line protection fuse and is pre-programmable.

According to the method according to the disclosure, the feeding in of the current generated by the energy generating system is controlled in such a way that no more than a specific maximum current is fed in. This maximum current may, however, be changed. For example, the maximum current may be raised, in order to be able to feed more current from the energy generating system into the line branch. According to one embodiment of the method according to the disclosure, however, the maximum current is only raised to allow more current from the energy generating system to be fed into the line branch after the limit value of the line protection fuse has been adapted in such a way that the maximum permissible value of the current in the line branch is not exceeded even after the raising of the maximum current. In this case, the raising of the maximum current is controlled by the feed control, which also controls the lowering of the limit value of the line protection fuse. If the limit value of the line protection fuse is not adapted, for example because the limit value has already reached its minimum value, the maximum current is not raised even when more current for feeding in from the energy generating system is available. It is in this way ensured overall that the maximum permissible value of the current in the line branch is not exceeded by an increased current feed from the energy generating system. Rather, the maximum current is adapted to the limit value of the line protection fuse in such a way that the maximum permissible value of the current cannot be exceeded. This does not mean, however, that the maximum permissible value for the current in the line branch can never be exceeded. For example, the switching on of an additional consumer in the line branch may cause a brief tolerable state of overcurrent, in response to which the line protection fuse is not triggered, nor is intended to be triggered, on the basis of its triggering characteristic.

Correspondingly, when reference is made hereinafter to prevention of the exceeding of the maximum permissible value of the current in the line branch, this is to be understood as meaning that this value cannot be exceeded on account of the raising of the maximum current of the energy generating system any more or any longer than the triggering characteristic of the line protection fuse in any case permits.

In one embodiment, if more current than the maximum current can be fed into the line branch from the energy generating system, the limit value of the line protection fuse may be adapted in one step to an amount corresponding to the additionally available current.

After the lowering of the limit value of the line protection fuse, the maximum current is then raised by this amount.

It may, however, also be provided that the limit value and the maximum current are adapted step by step. With a step-by-step adaptation, a kind of soft control can be achieved, i.e. variation of the maximum current substantially without any abrupt changes, the limit for the current that is fed altogether into the line branch not deviating significantly from the maximum permissible value for the current in the line branch even during the adaptation. For particularly soft control, an adaptation in small steps may be chosen. If the adaptation is to be performed particularly quickly, it may be advantageous to choose steps that are greater or follow one another more quickly. In particular, step-by-step adaptation instead of a one-off abrupt lowering of the limit value of the line protection fuse makes it possible to minimize the risk of an unwanted inadvertent triggering of the line protection fuse.

Furthermore, the limit value and the maximum current may be adapted while taking prescribed variations over time into account. For example, the adaptation of the maximum current may be performed with a time delay in relation to the adaptation of the limit value, the maximum current being adapted with the same, under some circumstances stepless, variation over time as the limit value. A ramp may be prescribed for example as a variation over time for the adaptation.

The adaptation of the limit value and the maximum current is controlled by the feed control. The feed control, the line protection fuse and the energy generating system may in this case be formed as separate units, the feed control being connected to the line protection fuse and the energy generating system for controlling the limit value and the maximum power. However, the feed control is preferably formed integrally with the line protection fuse, the feed control being connected to the energy generating system for prescribing the maximum current.

According to one embodiment of the method according to the disclosure, when more current than the maximum current at the particular time could be fed into the line branch from the energy generating system, a request signal is sent from the energy generating system to the feed control. In response to the request signal, then—if possible—the limit value of the line protection fuse is reduced, under the control of the feed control, by a specific amount. When the limit value has been reduced by the specific amount, a control signal with which the increase in the maximum current for the feeding in of additional current by the specific amount is enabled is sent from the feed control to the energy generating system. It is in this way ensured that the maximum current is only raised, under the control of the feed control, after the lowering of the limit value of the line protection fuse.

The request signal may be sent from the energy generating system to the feed control directly in response to it being detected that more current than the maximum current at the particular time could be fed in from the energy generating system. Alternatively, however, it may also be provided that the request signal is only sent in response to an enquiry signal that is sent by the feed control to the energy generating system and with which it is enquired which current could at the moment be fed into the line branch. In that case, the feed control therefore assumes the active part of the control, while the energy generating system merely responds to the signals of the feed control.

The amount by which the limit value of the line protection fuse and subsequently the maximum current are adapted may correspond in each case to the amount of additionally available current from the energy generating system. It may, however, also be provided that the adaptation of the limit value and the maximum current is performed in a number of steps, by the limit value and the maximum current only being reduced or raised in each case by a fraction. For example, in the case of a step-by-step adaptation, the limit value and the maximum current could be adapted by a fixed prescribed amount in each adaptation step, the number of adaptation steps depending on the amount of current additionally available.

In order to ensure that the maximum current is adapted in response to a previously sent request signal, in one embodiment it may be provided that the maximum current is only raised when the control signal is received within a prescribed time interval after the sending of the request signal by the energy generating system. It can thereby be prevented for example that the raising of the maximum current occurs even though no request signal at all has been sent. In a further refinement, after the receipt of a control signal that is received outside the prescribed time interval, a request signal may be automatically sent by the energy generating system in order to ensure that the limit value of the line protection fuse and the maximum current are made to match one another and are adapted to the conditions actually prevailing.

Furthermore, it may be provided that, after a prescribed time interval in which no control signal has been received in response to a request signal, a further request signal is sent by the energy generating system to the feed control.

In order that it can be detected by the feed control whether the limit value has actually been lowered and/or the maximum current has actually been raised, a confirmation signal may be sent to the feed control by the line protection fuse after the lowering of the limit value and/or a confirmation signal may be sent to the feed control by the energy generating system after the raising of the maximum current. In particular, it may be provided that a control signal is only sent by the feed control to the energy generating system when there is a confirmation signal from the line protection fuse for the lowering of the limit value. It may also be provided that a further request signal is only responded to when there is already a confirmation signal from the energy generating system in relation to the preceding request signal.

It is ensured by the foregoing measures that the triggering of the power protection fuse when excessive currents flow in the line branch does not depend on a correct transmission of some signals or other during this serious case, and is therefore not delayed in an uncontrolled manner.

The transmission of the request, enquiry, control and confirmation signals can be executed in a particularly uncomplex and/or flexible manner if the signals are transmitted between the energy generating system and the feed control wirelessly or by way of the line branch. For a unique assignment, the signals exchanged between a specific energy generating system and the feed control may be coded, for example by way of specific pulse patterns, a frequency or an address contained in the signals. The communication between the feed control and the line protection fuse may also take place wirelessly or by way of the line branch. If the feed control and the line protection fuse are formed as one unit, the communication or control may, however, take place in particular by way of conducting connections of this unit or by way of a data transmission on an optical basis (for example by way of optocouplers).

When the maximum current at the particular time can no longer be fed into the line branch from the energy generating system, it is advantageous if the maximum current is lowered by a specific amount and the limit value of the line protection fuse is raised by the specific amount, in order to ensure the power supply to the line branch in the maximum permissible framework. According to an embodiment according to the disclosure, the maximum current is lowered by a specific amount if the current fed in from the energy generating system deviates from the maximum current by more than a prescribed differential amount. However, the limit value of the line protection fuse is in this case raised by the specific amount after the lowering of the maximum current. In this way it is prevented that, during the adaptation of the maximum current or the limit value, the maximum permissible value of the current in the line branch can be exceeded in the interim. As in the case of the raising of the maximum current, the control may in this case take place by way of the exchange of corresponding signals. Furthermore, the adaptation may be performed in one step by the prescribed differential amount. However, the adaptation of the limit value and the maximum current may also take place step by step and/or with a prescribed variation over time being taken into account.

If more current than the maximum current is available from the energy generating system, it may be provided that the current in excess of the maximum current is used for charging an energy buffer store. The decision whether energy is to be stored in the energy buffer store may take place for example in dependence on whether a further lowering of the limit value of the line protection fuse is possible, and consequently also a further raising of the maximum current for the feeding in of additional current. Other parameters, such as the charging state of the energy buffer store, may also be taken into account. The energy stored in the energy buffer store may be used for example for temporarily bridging an increased energy demand that cannot be covered by the energy generating system alone. In particular, it is possible in this way to avoid the maximum current and the limit value being repeatedly raised and lowered over a short period of time when there are brief dips in the current provided by the energy generating system, caused for example in the case of a PV system by banks of cloud quickly passing over.

In particular, the current from the external energy supply network and the current from the energy generating system may be fed into the line branch in opposite end regions thereof. For example, the current supply through the external energy supply network may take place by way of a ground line, while the energy generating system is fitted on the roof of a house and is connected to the line branch in the region of the roof. In spite of the physical remoteness of the feed points, it can nevertheless be ensured with certainty by the method according to the disclosure that the maximum permissible value of the current in the power branch is not exceeded, by on the one hand the feeding in from the external energy supply network being limited by the line protection fuse and on the other hand the feeding in from the energy generating system being limited by the variable maximum current, controlled in dependence on the limit value of the line protection fuse.

With the limitation of the current I fed in from the energy generating system and the external energy supply network, there is also a limit on the power P respectively fed in, governed in a fixed relationship by $P=I^2R$, where R stands for the ohmic resistance of the line branch including the connected loads.

In order to fully utilize the transmission capacity of the line branch, it may be advisable that, instead of a constant maximum current, a maximum current in which the triggering characteristic of the line protection fuse is taken into account is prescribed for the current feeding in from the energy generating system. With the triggering characteristic taken into account, it is also possible to enable the feeding in of a current with which the maximum permissible value of the current in the line branch is under some circumstances briefly exceeded, but is set at such a level that it lies below the triggering characteristic of the line protection fuse for the line branch concerned. For example, the maximum current may be prescribed by the current I that is fed in from the energy generating system not exceeding a maximum mean value, averaged over a predefined time interval t, or the square of the current I that is fed in altogether over a prescribed time interval t, i.e. the time integral of $I^2$ over the time interval t, not exceeding a prescribed value. Using this embodiment of the method according to the disclosure, it is possible for example in the case of an energy generating system operated at a cut-back level to establish how much electrical power the energy generating system could feed into the line branch as a maximum, i.e. when it is operated without being cut back. For this purpose, the energy generating system—starting from its cut-back operation—may be briefly operated at another operating point, as long as it is ensured that the operation at the other operating point lies below the triggering characteristic of the line protection fuse on account of the short time period. In this way it can be detected—possibly a number of times one after the other at different operating points, for example with different generator voltages of a photovoltaic system—how much generator power is available there for a short time, and from this the maximum possible feed-in power can be estimated. It may similarly be advisable to adapt the triggering characteristic of the line protection fuse in dependence on the prehistory of the line branch, i.e. dependent on the extent to which the maximum permissible value of the current was also actually achieved within a specific time period in the immediate past. This presupposes that the variation over time of the current actually fed in is determined and the data are transmitted to the feed control. This allows the initial state of the line at the particular time to be deduced, in order to determine the permissible value of the maximum current at that moment or in order to determine whether, when the maximum permissible value of the current is exceeded, under some circumstances momentarily, the line protection fuse must be triggered.

According to one particular embodiment of the method according to the disclosure, current is fed into the line branch from a plurality of energy generating systems. In this case, each energy generating system is controlled in such a way that no more than a respectively specific, but variable maximum current is fed into the line branch. The raising of the respective maximum current to allow more current from the corresponding energy generating system to be fed into the line branch is in this case controlled centrally by the feed control. The raising of the respective maximum current centrally under the control of the feed control allows it to be made possible in a simple way also for the maximum permissible value of the current in the line branch not to be exceeded in the interim. In order to be able to control the energy generating systems individually in each case, it may be provided that different pulse patterns and/or different frequencies are used for the signal exchange. As an alternative to this, it may be provided that a transmitted communication data packet has the recipient or recipients, possibly the sender, of the data packet in a coded way. Control over the respective maximum currents may be maintained in such a way as to make it possible for the power demand to be satisfied by as few energy generating systems as possible. It may, however, also be provided that the maximum power levels are controlled by the feed control in such a way that the different energy generating systems contribute to the current that is fed altogether into the line branch in proportions that are as far as possible equal.

A further solution according to the disclosure concerns a feed control for the feeding of electrical current from an energy generating system and an external energy supply network into a line branch of an electrical installation that is designed for a current below a maximum permissible value. The feed control has a line protection fuse, which prescribes a variable limit value for the electrical current fed in from the external energy supply network. In this case, additionally prescribed triggering characteristics may be stored in the line protection fuse. For example, different time periods that define in dependence on the size of the respectively pertaining overcurrent the corresponding triggering time of the power protection fuse may be prescribed. Furthermore, the feed control has a controller for determining a maximum current that may be fed in from the energy generating system as a maximum in order to prevent the maximum permissible value of the current in the line branch being exceeded. Furthermore, the feed control has an interface for sending control signals to the energy generating system for prescribing the maximum current, the interface only sending a control signal for prescribing a higher maximum current, whereby more current can be fed into the line branch from the energy generating system, after the limit value of the line protection fuse has been adapted in such a way that the maximum permissible value of the current in the line branch is not exceeded even after the raising of the maximum current.

In particular, the feed control may be designed for carrying out the method according to the disclosure. For this purpose, the feed control may for example additionally have an interface for receiving request signals sent by the energy generating system that concern the raising and possibly the lowering of the maximum current in order to be able to feed in more current from the energy generating system or possibly to be able to feed in more current from the external energy supply network. The interfaces for sending control signals or for receiving request signals may also be designed suitably for sending to the energy generating system enquiry signals for enquiring the current that could at the particular time be fed into the line branch from the energy generating system or for receiving from the energy generating system confirmation signals for confirming the adaptation of the maximum current. In addition, the interfaces for sending control signals or for receiving request signals may also be designed suitably for receiving from the line protection fuse confirmation signals for confirming the raising or lowering of the limit value.

Advantageous developments of the disclosure are provided by the patent claims, the description and the drawings. The advantages mentioned in the description of features and of combinations of multiple features are only of an exemplary nature and may come into effect alternatively or cumulatively without the advantages of embodiments according to the disclosure necessarily having to be achieved. With regard to the disclosure content of the original application documents and of the patent, the following applies, without the subject matter of the appended patent claims being altered as a result: further features can be taken from the drawings—in particular the geometries represented and the relative dimensions of a number of components in relation to one another and their relative arrangement and operative connection. The combination of features of different embodiments of the disclosure or features of different patent claims is likewise possible in a way departing from the chosen dependency references of the patent claims, and is herewith suggested. This also applies to those features that are represented in separate drawings or mentioned in the description thereof. These features may also be combined with features of different patent claims. Similarly, features recited in the patent claims may be omitted for other embodiments of the disclosure. The features mentioned in the patent claims and the description should be understood with respect to their number such that precisely this number or a greater number than the number mentioned is present, without explicit use of the adverb "at least" being required. If, therefore, mention is made for example of an element, this should be understood as meaning that precisely one element, two elements or more elements are present. These features may be supplemented by other features or be the only features of which the respective product consists. The designations contained in the patent claims do not represent any restriction of the scope of the subjects that are protected by the patent claims. They merely serve the purpose of making the patent claims more easily understandable.

BRIEF DESCRIPTION OF THE DRAWINGS

The disclosure is further explained and described below on the basis of preferred embodiments that are represented in the figures.

DETAILED DESCRIPTION

Figure 1:
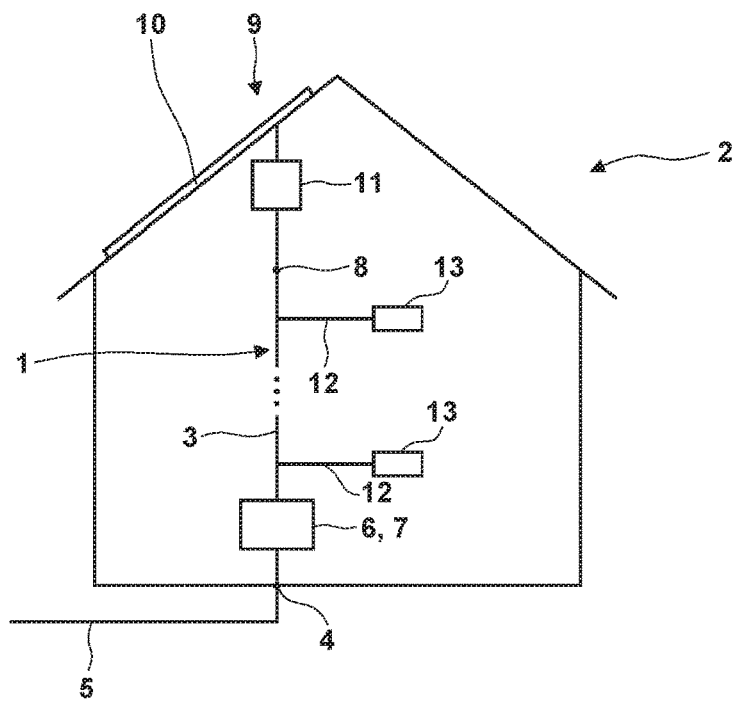
FIG. 1 shows a feed control according to the disclosure for the feeding of electrical current from a PV system and an external energy supply network into a line branch in a household.

FIG. 1 shows an electrical installation 1 for a house 2 with a line branch 3. The line branch 3 for feeding in electrical current is connected to an external energy supply network 5 by way of a connection point 4. In this case, the electrical current fed in from the external energy supply network 5 is fed into the line branch 3 by way of a line protection fuse 7, which is part of a feed control 6, the line protection fuse 7 prescribing a limit value for the current fed in from the external energy supply network 5. Furthermore, the line branch 3 has a connection point 8 for an energy generating system 9, here a PV system 10, with an associated inverter 11. As represented in FIG. 1, the line branch 3 may have one or more sub-branch(es) 12 with loads 13, which are supplied with the current fed in from the energy generating system 9 and the external energy supply network 5.

The inverter 11 of the energy generating system 9 is used to control how much current is fed into the line branch 3 from the PV system 10. In this case, the feeding in is controlled by the inverter 11 in such a way that no more than a prescribed maximum current is fed into the line branch 3 from the energy generating system 9. The control of the current fed in from the energy generating system 9 may take place for example by using the P(U) characteristic of the PV system 10, by the operating point at the particular time being chosen such that the prescribed maximum current is not exceeded. If it is detected by the control of the inverter 11 that at the particular time more current could be fed into the line branch 3 from the energy generating system 9, it is desirable to use the available additional current for supplying the loads 13 in order to have to draw less current from the external energy supply network 5. If the additional current were fed into the line branch 3 without further adaptation, however, a state of overcurrent, in which the maximum permissible value for the current in the line branch 3 is exceeded, could occur in the line branch 3, since then an unchanged large amount of current from the external energy supply network 5 and at the same time more current from the energy generating system 9 could be fed into the line branch 3.

The concept "state of overcurrent within the line branch 3" also includes in particular the possible fault case of a state of overcurrent in at least one of the sub-branches 12 connected to this line branch 3. This is the case for example whenever a relatively great number of loads 13 are connected to a specific sub-branch 12 and are operated simultaneously. Here, too, the loads 13 in the one sub-branch 12 under consideration are generally supplied with current both from the energy generating system 9 and from the external energy supply network 5. If, for example, the current drawn from the external energy supply network 5 specifically still lies below the limit value for the triggering of the line protection fuse 7, an undetectable state of overcurrent easily occurs in the sub-branch 12 concerned unless a corresponding limitation or adaptation of the maximum current of the energy generating system 9 is provided. This also applies in particular for the case where, although all of the loads 13 connected to the sub-branch 12 concerned have no defect when considered on their own, altogether there are simply too many loads 13 being operated at the same time in the sub-branch 12.

In order to prevent a state of overcurrent in the line branch 3 and the sub-branches 12 connected thereto, according to the disclosure first the limit value of the line protection fuse 7 is adapted, under the control of the feed control 6, in such a way that the maximum permissible value of the current in the line branch 3 is not exceeded when the additional current from the energy generating system 9 is fed into the line branch 3. Only after the reduction of the limit value of the line protection fuse 7, whereby less current from the external energy supply network 5 can be fed into the line branch 3 before the line protection fuse 7 is triggered, is the maximum current for the energy generating system 9 raised, under the control of the feed control 6. Only then can an operating point at which more current from the energy generating system 9 is fed into the line branch 3 for supplying the loads 13 be chosen.

In order to avoid an interim undersupply to the line branch 3 and/or an incorrect triggering of the line protection fuse 7, the limit value of the line protection fuse 7 is, in one embodiment, not reduced in one step by the amount of the current that is additionally available from the energy generating system 9. Rather, the adaptation of the limit value of the line protection fuse 7 and of the maximum current for the energy generating system 9 is performed in smaller steps in a controlled manner by the feed control 6. In one embodiment the steps should preferably be chosen here such that the current that can be fed into the line branch 3 altogether from the energy generating system 9 and the external energy supply network 5 comes as close as possible to the maximum permissible value for the line branch 3. At the same time, the step increment should be chosen such that the control does not become too complex and the adaptation can be performed in as short a time as possible. The determination of the maximum current that may, starting from the limit value at the particular time of the line protection fuse 7, be fed in as a maximum from the energy generating system 9 may take place by means of a controller of the feed control 6. A particularly low level of communication complexity is required if the lowering of the limit value and the raising of the maximum current are performed on the basis of predefined ramps. In the simplest case, this employs a trigger signal at the start of the ramp for the lowering of the limit value of the line protection fuse 7, with which the raising of the maximum current according to the prescribed ramp is initiated shortly or immediately after the start of the lowering of the limit value.

In the case of the electrical installation 1 represented in FIG. 1, the communication between the feed control 6 and the inverter 11 for prescribing the maximum current takes place by way of the line branch 3 itself on the basis of what is known as power line communication. Alternatively, the feed control 6 and the inverter 11 may, however, also have interfaces for wireless communication.

Although represented as such in FIG. 1, the method according to the disclosure is not necessarily restricted to a power generating system 9 in the form of a PV system 10. Rather, other controllable energy generating systems 9, for example fuel cells, wind turbines, combined heat and power generating plants, etc., may be alternatively or else cumulatively used. It is at the same time possible to connect additionally along with the energy generating system 9 an energy buffer store (not represented in FIG. 1), which then can buffer short-term power fluctuations, in particular of the energy generating system 9. It can in this way be prevented that an unwanted rapidly successive adaptation of the limit value and the maximum current occurs on account of the naturally occurring power fluctuations.

Figure 2:
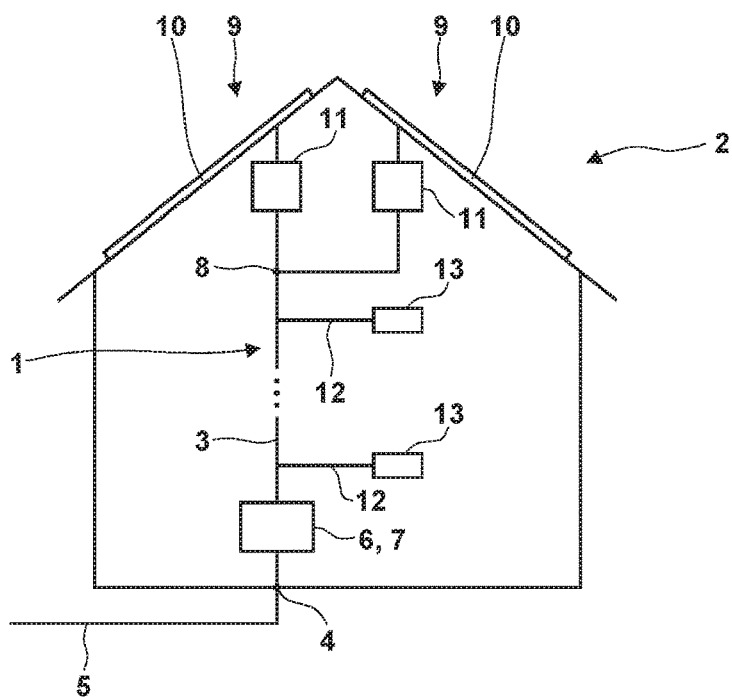
FIG. 2 shows a feed control according to the disclosure for the feeding of electrical current from two PV systems and an external energy supply network into a line branch in a household.

In the case of the electrical installation 1 shown in FIG. 2, two energy generating systems 9 are connected to the connection point 8 for the feeding of electrical current into the line branch 3. In this case, the feeding of current into the line branch 3 is controlled centrally by the feed control 6 with the line protection fuse 7. The maximum currents prescribed for the two energy generating systems 9 and the limit value of the line protection fuse 7 are in this case made to match one another in such a way that the maximum permissible value of the current in the line branch 3 is not exceeded. If more current can be fed into the line branch 3 from one of the energy generating systems 9, the limit value of the line protection fuse 7 is reduced—if possible. After the reduction of the limit value (or with a time delay), the maximum current of the corresponding energy generating system 9 is adapted. In order to be able to feed in more current from the one energy generating system 9, instead of reducing the limit value of the line protection fuse 7 the maximum current for the other energy generating system 9 may be reduced. In that case, first the maximum current of the other energy generating system 9 is reduced, under the control of the feed control 6. Then, the maximum current of the energy generating system 9 from which more current can be fed into the line branch 3 is raised. An adaptation of the limit value of the line protection fuse 7 then does not have to be performed. Here, too, it is possible to carry out the adaptation as already described further above in the form of small successive steps or by following predefined ramps.

Unlike in the case of the example embodiment represented in FIG. 2, the electrical installation 1 may also have a number of line branches 3, an energy generating system 9 for the feeding of current into the respective line branch 3 being respectively provided for each line branch 3. For the feeding in of current from the external energy supply network 5 and for controlling the feeding in of the current, the electrical installation 1 may have a single, common feed control 6 with a number of line protection fuses 7 for each of the line branches 3. For the communication between the feed control 6 and the energy generating systems 9, the feed control 6 may have a common interface. There may, however, also be an interface provided for each energy generating system 9. For example, the communication may take place by way of the respective line branch 3.

Figure 3:
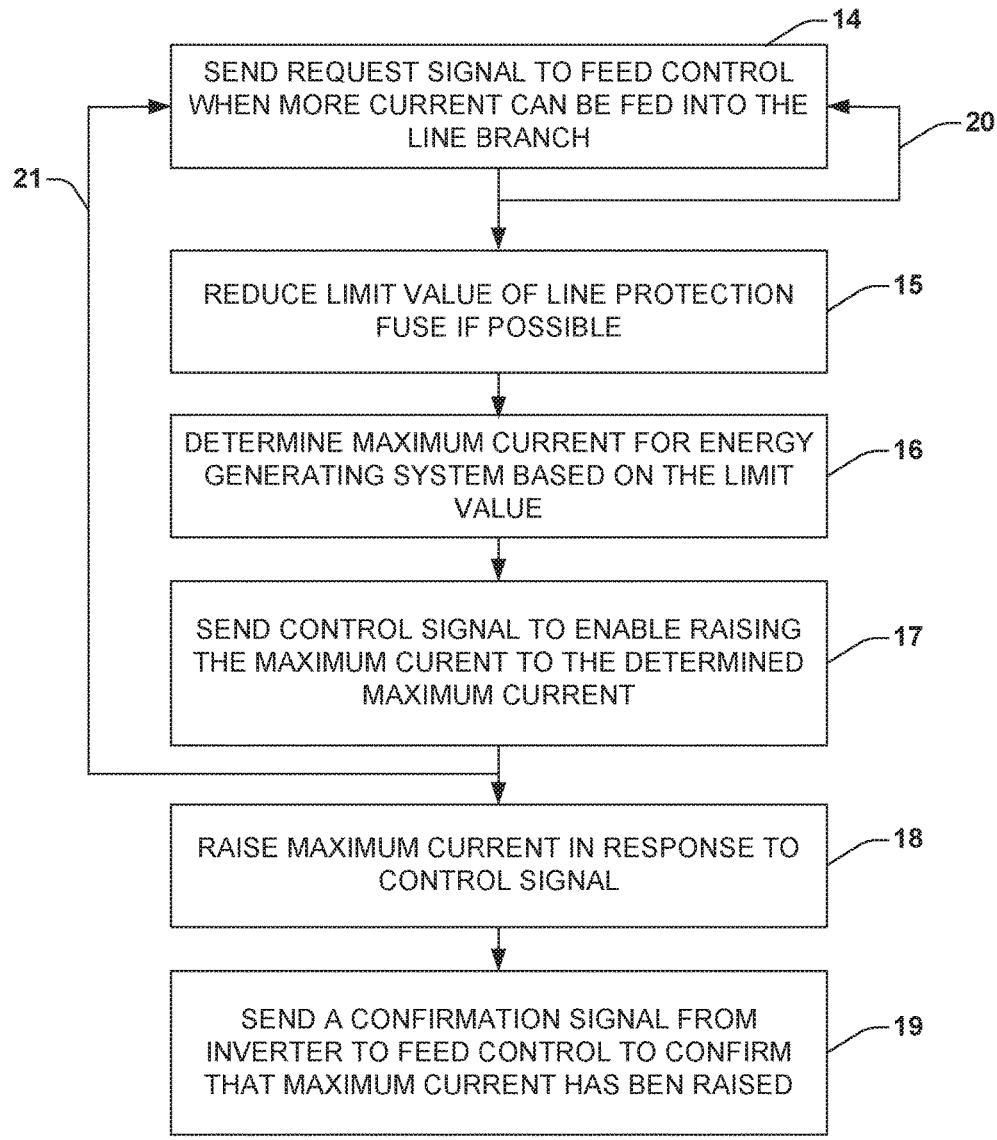
FIG. 3 shows a greatly simplified block diagram for a method according to the disclosure for raising the maximum current.

FIG. 3 shows a sequence, given by way of example, of a method according to the disclosure: When more current can be fed into the line branch 3 from the energy generating system 9, a request signal is sent from the energy generating system 9 to the feed control 6 at 14. The request signal may in this case be received by way of a corresponding interface of the feed control 6. If the limit value of the line protection fuse 7 can be reduced further, the limit value of the line protection fuse 7 is reduced, under the control of the feed control 6 at 15. Then, at 16, the maximum current for the energy generating system 9 is determined in dependence on the limit value at the particular time by a controller of the feed control 6. Subsequently, at 17, a control signal with which the raising of the maximum current to the determined maximum current is enabled is sent by way of the interface of the feed control 6 to the inverter 11. At 18, the raising of the maximum current takes place in order to feed more current from the energy generating system 9 into the line branch 3. After that, at 19, a confirmation signal may be optionally sent from the inverter 11 to the feed control 6 in order to confirm to the latter that the maximum current has been raised as intended.

Apart from acts 14 to 19, further acts may be provided and/or some of the acts may be combined into one act. As indicated in FIG. 3, for example a safety loop 20 may be provided for the purpose that, after the sending of the request signal at 14, a further request signal is sent by the inverter 11 if a control signal has not been received within a prescribed time period. It can in this way be prevented that a maximum current is belatedly raised even though at that moment the maximum current can no longer be fed in from the energy generating system 9, for example on account of changed weather conditions. It may also be provided in one embodiment that an alteration of the maximum current at 18 can only be performed if the control signal is received by the inverter 11 within a prescribed time interval after the sending of the request signal at 14. If, for example, a control signal is received without a request signal previously having been sent, or the sending of a request signal was more than a prescribed time period ago, at 18 a safety loop 21 beginning with the sending of a request signal according to act 14 may be executed instead of the raising of the maximum current. If appropriate, an adjustment of the values at the particular time of the limit value of the line protection fuse 7, of the maximum current of the energy generating system 9 and of the maximum permissible current for the line branch 3 may once again be performed within the safety loops 20, 21. If these values do not match one another, because for example a lowering of the limit value for the line protection fuse 7 took place without the corresponding raising of the maximum current of the energy generating system 9, this mismatched state can be corrected and a correct initial state can be reestablished. It may also be provided that the reducing of the limit value at 15, the determining of the maximum current at 16 and the sending of the control signal at 17 are executed in a common method step, whereby a time information as to when the maximum current may be raised being contained in the control signal. This is advisable in particular whenever the lowering of the limit value and the raising of the maximum current are carried out as already described further above in the form of small successive steps or by the following of predefined ramps or variations over time.

Figure 4:
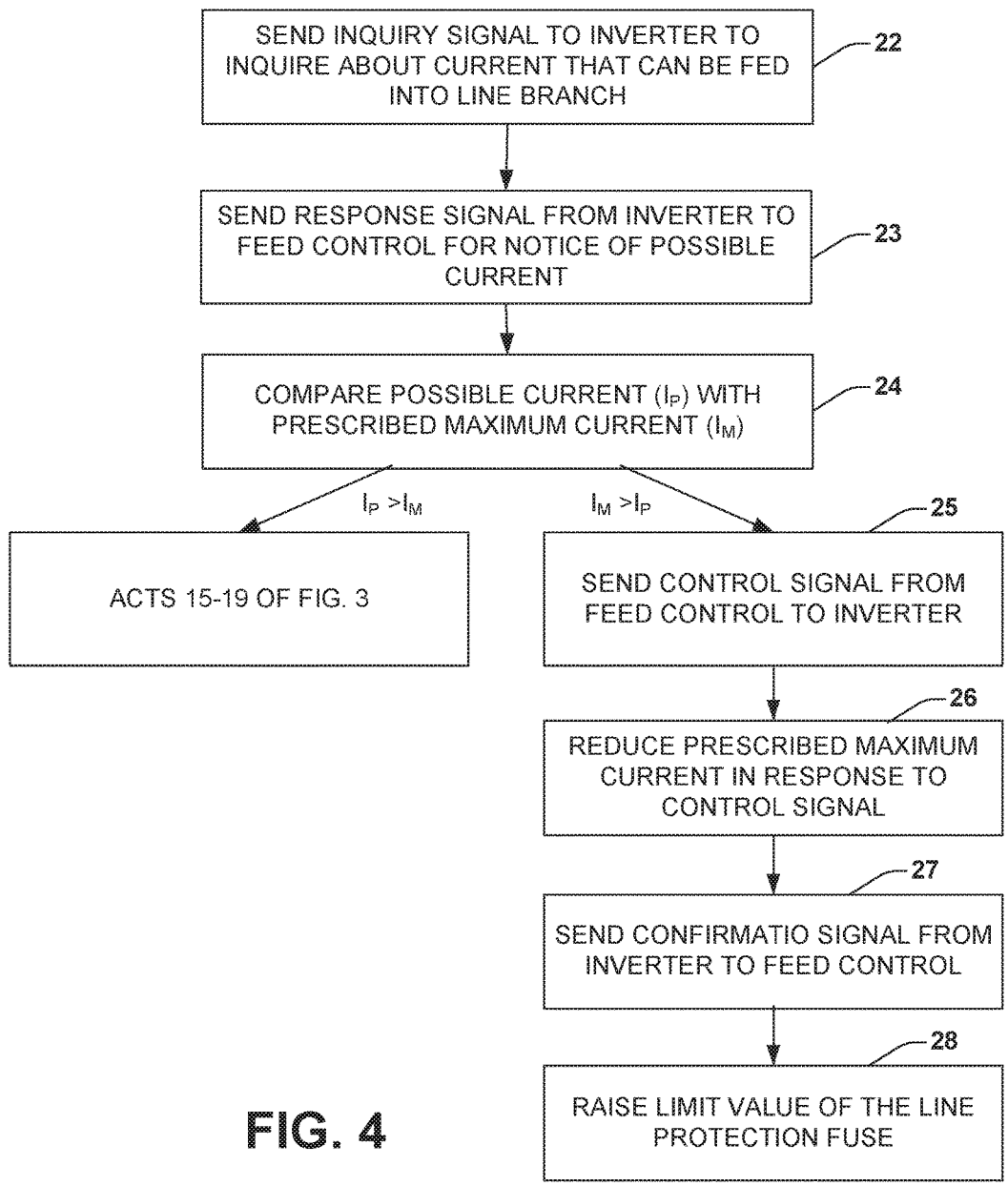
FIG. 4 shows a greatly simplified block diagram for a method according to the disclosure for adapting the maximum current.

FIG. 4 shows a further sequence, given by way of example, of a method according to the disclosure: At 22, an inquiry signal is sent by way of the interface of the feed control 6 to the inverter 11, to inquire about the current that could at the particular time be fed from the energy generating system 9 into the line branch 3. At 23, the inverter 11 sends a response signal to the feed control 6, in order to give notice of the current that is possible at the particular time. The response signal may also be interpreted as a kind of request signal, since, in dependence on the response signal, an adaptation of the limit value of the line protection fuse 7 and of the maximum current of the energy generating system 9 is initiated in a way similar to the sending of the request signal at 14. At 24, a comparison of the current that could at the particular time be fed from the energy generating system 9 into the line branch 3 with the maximum current prescribed at the particular time takes place. If at the particular time more current than is prescribed by the maximum current could be fed in ($I_P > I_M$), the adaptation of the limit value and of the maximum current is performed according to the sequence represented in FIG. 3 at acts 15 to 19.

If the comparison of the current that can at the particular time be fed into the line branch 3 from the energy generating system 9 with the maximum current prescribed at the particular time shows that at the particular time only less than the maximum current can be fed into the line branch 3 from the energy generating system 9 ($I_M > I_P$), the maximum current and the limit value of the line protection fuse 7 are adapted at acts 25 to 28 to prevent a potential undersupply to the line branch 3. For this purpose, the limit value of the line protection fuse 7 must be raised in order to be able to feed more current from the external energy supply network 5 into the line branch 3. In order to prevent an interim state of overcurrent, before the raising of the limit value the maximum current must first be reduced. For this purpose, at 25, a control signal with which a smaller maximum current than the maximum current at the particular time is prescribed is sent from the interface of the feed control 6 to the inverter 11. Controlled by the control signal, the prescribed maximum current is reduced at 26. At 27, a confirmation signal with which it is confirmed that the maximum current has been reduced is sent from the inverter 11 to the feed control 6. At 28, the limit value of the line protection fuse 7 can then be raised, whereby more current can be fed from the external energy supply network 5 into the line branch 3 without this leading to a triggering of the line protection fuse 7.

In order to avoid on the one hand an incorrect triggering of the line protection fuse 7 and on the other hand a communication complexity on the greatest scale, here, too, it is advisable if the raising of the limit value for the line protection fuse 7 and the lowering of the maximum current of the energy generating system 9 are carried out as already described further above in the form of small successive steps or on the basis of following predefined ramps or variations over time that are made to match one another. In order to prevent with certainty a state of overcurrent in one embodiment, it must in this case be ensured that the lowering of the maximum current of the energy generating system 9 according to a prescribed ramp or a prescribed variation over time first begins before the limit value for the line protection fuse 7 is raised according to the prescribed ramp or the prescribed variation over time.

The invention claimed is:

1. A method for the feeding of electrical current into a line branch of an electrical installation that is protected by a line protection fuse and is designed for a current up to a maximum permissible value, comprising:
   feeding into the line branch an electrical current from an external energy supply network and electrical current from an energy generating system;
   limiting the feeding in of the electrical current into the line branch from the external energy supply network by the line protection fuse, which prescribes a limit value for the electrical current fed into the line branch; and
   controlling the feeding in of the electrical current generated by the energy generating system so that no more than a specific, but variable maximum current is fed into the line branch,
   wherein the variable maximum current is raised, under the control of a feed control, to allow more electrical current from the energy generating system to be fed into the line branch after the limit value of the line protection fuse has been lowered, under the control of the feed control, in such a way that the maximum permissible value of the current in the line branch is not exceeded even after the raising of the maximum current.

2. The method as claimed in claim 1, wherein the limit value and the variable maximum current are adapted, under the control of the feed control, step by step or with a prescribed variation over time being taken into account, or both.

3. The method as claimed in claim 1, further comprising:
   when more electrical current than the maximum current at the particular time could be fed into the line branch from the energy generating system, sending a request signal from the energy generating system to the feed control;
      lowering the limit value of the line protection fuse, under the control of the feed control, by a specific amount in response to the request signal; and
      sending a control signal that enables the raising of the maximum current for the feeding in of additional current by the specific amount from the feed control to the energy generating system.

4. The method as claimed in claim 3, further comprising raising the maximum current after the sending of the request signal only when the control signal is received within a prescribed time interval by the energy generating system.

5. The method as claimed in claim 3, further comprising sending a further request signal by the energy generating system to the feed control after a prescribed time interval in which no control signal has been received in response to a request signal.

6. The method as claimed in claim 1, further comprising sending a confirmation signal to the feed control after the raising of the maximum current and/or the lowering of the limit value.

7. The method as claimed in claim 3, further comprising transmitting the signals exchanged between the energy generating system and the feed control wirelessly or by way of the line branch.

8. The method as claimed in claim 1, further comprising:
   lowering the maximum current by a specific amount if the electrical current fed in from the energy generating system deviates from the maximum current by more than a prescribed differential amount; and
   raising the limit value of the line protection fuse by the specific amount after the lowering of the maximum current.

9. The method as claimed in claim 1, further comprising:
   using the electrical current from the energy generating system in excess of the maximum current for charging an energy buffer store; and/or
   feeding electrical current from the energy buffer store into the line branch when less than the maximum current is fed in from the energy generating system.

10. The method as claimed in claim 1, wherein the electrical current from the external energy supply network and the electrical current from the energy generating system are fed in in opposite end regions of the line branch.

11. The method as claimed in claim 1, wherein the maximum current takes a triggering characteristic of the line protection fuse into account.

12. The method as claimed in claim 1, further comprising:
   feeding in electrical current from a plurality of energy generating systems into the line branch;
   controlling each energy generating system so that no more than a respectively specific, but variable maximum current is fed into the line branch; and
   centrally controlling the raising of the respective maximum current to allow more electrical current from the corresponding energy generating system to be fed into the line branch using the feed control.

13. A feed control for the feeding of electrical current from an energy generating system and an external energy supply network into a line branch of an electrical installation that is protected by a line protection fuse and is designed for a current below a maximum permissible value, comprising:
   using the line protection fuse to prescribe a limit value for the electrical current fed in from the external energy supply network;
   determining a maximum current that may be fed in from the energy generating system as a maximum using a controller in the feed control in order to prevent the maximum permissible value of the current in the line branch from being exceeded; and
   sending control signals to the energy generating system for prescribing the maximum current using an interface in the feed control,
   wherein the interface sends a control signal for prescribing a higher maximum current, whereby more electrical current can be fed into the line branch from the energy generating system, after the limit value of the line protection fuse has been lowered in such a way that the maximum permissible value of the current in the line branch is not exceeded even after raising of the maximum current.

14. The feed control as claimed in claim 13, wherein the feed control has an interface for receiving request signals sent by the energy generating system that concern the raising of the maximum current in order to be able to feed in more electrical current from the energy generating system.

* * * * *